United States Patent [19]
Lisimaque et al.

[11] Patent Number: 5,479,637
[45] Date of Patent: Dec. 26, 1995

[54] METHOD AND DEVICE FOR UPDATING INFORMATION ELEMENTS IN A MEMORY

[75] Inventors: Gilles Lisimaque, Potomac, Md.; Pierre Paradinas, Villeneuve d'Ascq, France

[73] Assignee: Gemplus Card International, Gemenos, France

[21] Appl. No.: 984,431

[22] PCT Filed: Aug. 28, 1991

[86] PCT No.: PCT/FR91/00693

§ 371 Date: Feb. 25, 1993

§ 102(e) Date: Feb. 25, 1993

[87] PCT Pub. No.: WO92/04216

PCT Pub. Date: Mar. 19, 1992

[30] Foreign Application Priority Data

Aug. 31, 1990 [FR] France ................................. 90 10858

[51] Int. Cl.⁶ ................................................... G06F 12/02
[52] U.S. Cl. .................... 395/430; 395/443; 395/421.09; 364/DIG. 1; 235/492
[58] Field of Search ...................... 395/400, 425, 395/430, 443, 421.09; 235/492; 371/10.1, 10.2, 10.3

[56] References Cited

U.S. PATENT DOCUMENTS

| | | | |
|---|---|---|---|
| 4,339,804 | 7/1982 | Davison et al. | 395/425 |
| 4,442,345 | 4/1984 | Mollier et al. | 235/380 |
| 4,493,083 | 1/1985 | Kinoshita | 371/66 |
| 4,827,115 | 5/1989 | Uchida et al. | 235/492 |

FOREIGN PATENT DOCUMENTS 0340981  8/1989  European Pat. Off. .

Primary Examiner—Tod R. Swann
Assistant Examiner—Hiep T. Nguyen
Attorney, Agent, or Firm—Nilles & Nilles

[57] ABSTRACT

A method for updating information elements in a memory which includes a plurality of memory locations. An initial value D0 has been written at a first location E0 of the memory, E0 being determined by an initial value of a string of indicator bits, the initial value being defined by the parity of the rank of a last bit of the string of indicator bits in a programmed state. The method includes: writing a new value D1 at another location E1 of the memory, E1 being determined by the initial value of the string of logic indicator bits; verifying the written value in E1 by comparing the written value in E1 with D1; emitting an error code to a processing unit, if, after verifying the written value in El, the written value in E1 does not match D1; erasing the string of indicator bits entirely so that all of the indicator bits are in a blank state and writing the first bit to the programmed state, if, after verifying the written value in El, i) all the indicator bits are in the programmed state and ii) the written value in E1 matches D1, so as to make the value written in E1 accessible in a reading mode; and writing a first bit of the string of indicator bits in a blank state to the programmed state if, after verifying the written value in E1 and before erasing, i) the value written in E1 matches D1 and ii) all the indicator bits are not in the programmed state, so as to make the value written in E1 accessible in a reading mode. The plurality of memory locations are written serially according to successive updatings.

22 Claims, 3 Drawing Sheets

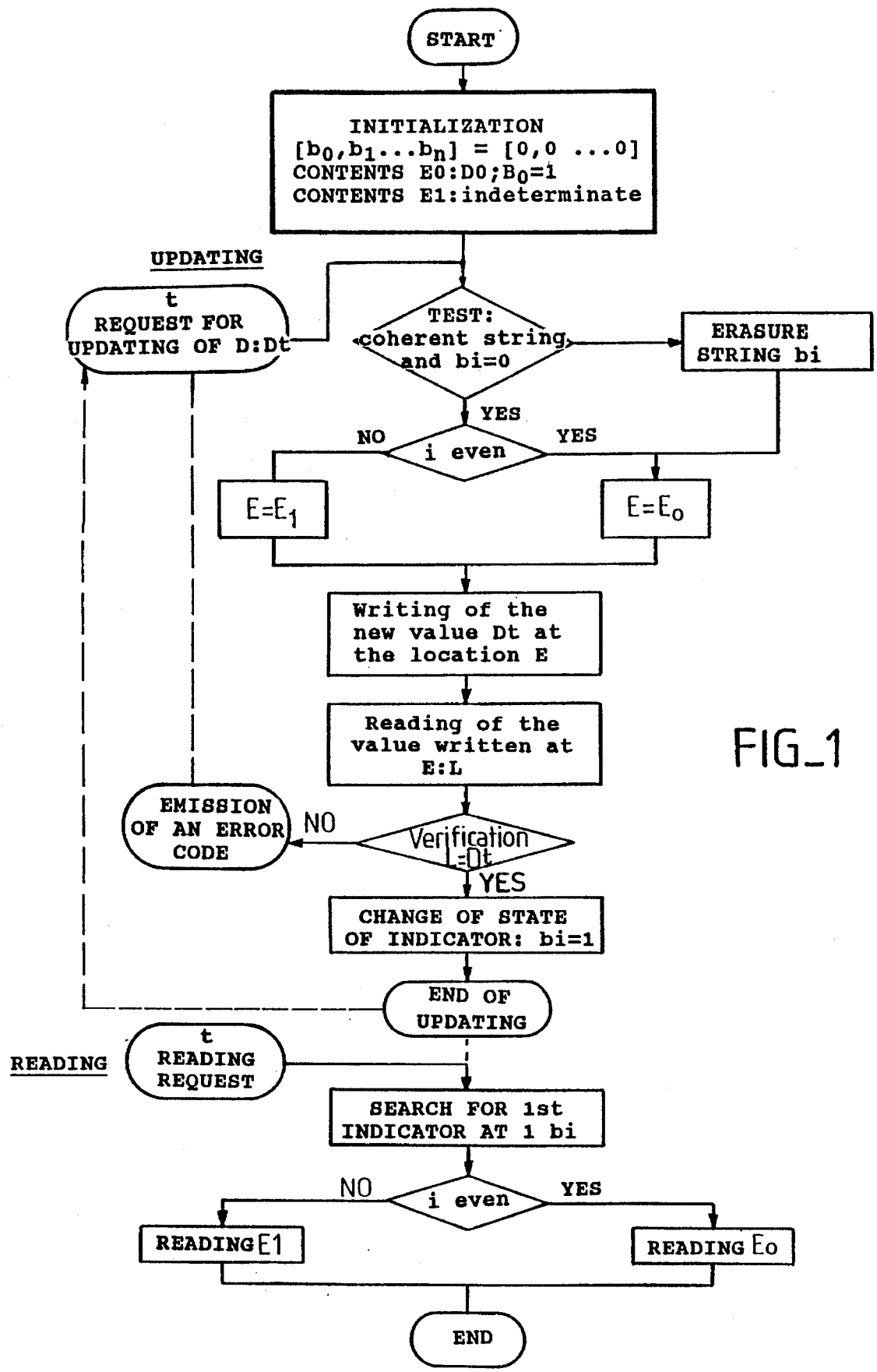
FIG_1

FIG_2
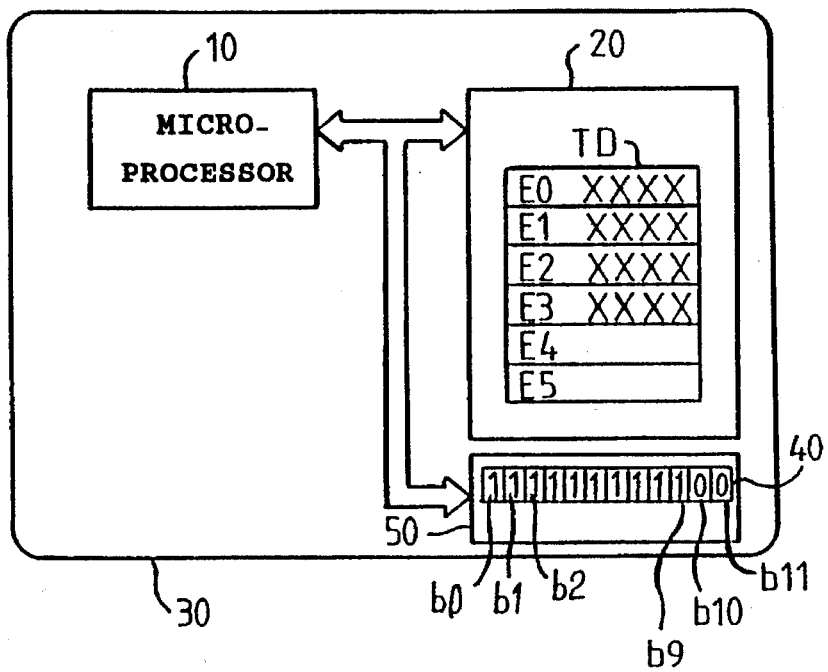
First bit at 0: b10 ==> Writing at E4
Last  bit at 1: b 9 ==> Reading at E3
FIG_4
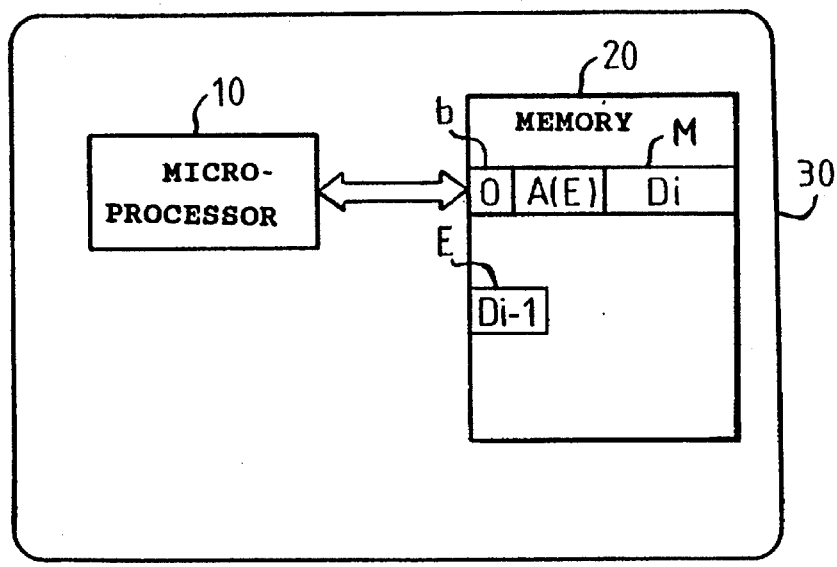
- WRITING at M
- TRANSFER M --> E
- READING: E

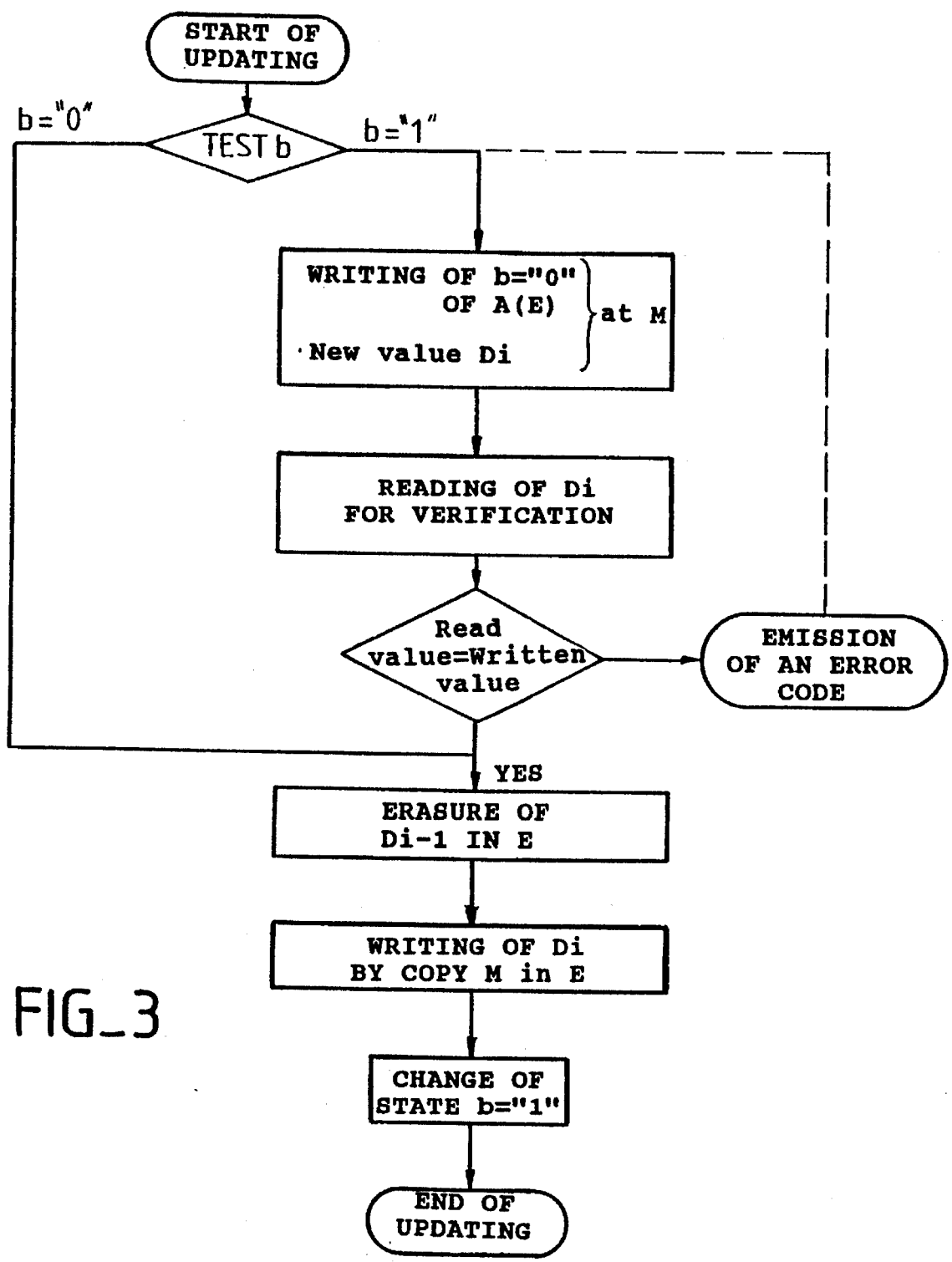
FIG_3

METHOD AND DEVICE FOR UPDATING INFORMATION ELEMENTS IN A MEMORY

CROSS-REFERENCE TO RELATED APPLICATION

This application claims a benefit of priority under 35 USC § 119 based on French patent application 90 10858, filed Aug. 31, 1990.

BACKGROUND OF THE INVENTION

1. Field of Use

The invention relates to the use of memories and, more particularly, an object of the invention is a method and the corresponding device for the updating of information elements in a memory and the use of said method and device in memory cards.

In memory cards that enable the updating of information elements recorded therein, notably RAM or EEPROM type memories, as opposed to the EEPROM memories where the updatings by erasure and re-recording are not possible, a major problem relates to possible interruptions in supply during the updating. Indeed, if an interruption of the supply voltage takes place during the updating of an information element, it may be the case that the former value of the data element has been only partially erased or that the new one has been only partially written in the memory.

2. Description of Related Art

This problem exists notably for the updating of computer memories. Solutions exist in this field. They make use of supplies that are not subject to cuts, or of particular methods for the management of access to information, by software.

In the field of memory cards, such solutions are not applicable for it is impossible to maintain the supply without cuts and, since the resources are highly limited in terms of program size, the only solution that can be contemplated is that of an a posterior checking of erased or written data elements, during the final application, in order to detect and then correct the errors if any.

SUMMARY OF THE INVENTION

An object of the invention is a method, and the corresponding device, for the updating of information elements in a memory that makes it possible, with a minimum use of resources, to ensure that the information that has to be updated is in a known state before the updating or after the updating, but never in an indeterminate state, and consequently makes it possible to carry out a transaction without ambiguity irrespectively of the instant of interruption, in the event of a problem.

According to the invention, the method for the updating of information elements in a memory is characterized in that, for the updating of a data element (D), an initial or preceding value (D0) of which has been written in the memory at a first memory location (E0), the method comprises the following steps:

in a first step, the writing of the new value (D1) is done in the memory at another memory location (E1), and is associated with a logic indicator that is initially in a first logic state, kept in this state during an updating;

in a second step, a verification of the new written value is done, this value being guaranteed in the event of coincidence with the value whose writing has been activated, and an error code being emitted in the event of non-coincidence;

and in a final step, the end of the updating activates the passage to a second logic state of the logic indicator, the updated value being then accessible in reading mode.

An object of the invention is also the device designed for the implementing of this method.

It is also an object of the invention to use a method such as this and a device such as this in memory cards.

BRIEF DESCRIPTION OF THE DRAWINGS

The invention will be understood more clearly, and other features will be revealed by means of the following description, made with reference to the appended figures.

FIGS. 1 and 2 respectively illustrate the steps of the updating method and the device designed for its implementation according to a first alternative embodiment.

FIGS. 3 and 4 respectively illustrate the steps of the updating method, and the device designed for its implementation according a second alternative embodiment.

DESCRIPTION OF PREFERRED EMBODIMENTS

In a re-recordable memory of the EEPROM or RAM type, the safeguarding of an operation for the writing of a data element is most usually done only after a prior operation for resetting the corresponding memory location at zero. Furthermore, the writing operation can generally be done only once. The writting of a data element is done by bits, bytes or words. Consequently, as indicated here above, it is possible that a data element will be only partially written when, owing to an interruption, the sequence of operations necessary for the writing of the data element is interrupted. A state such as this for the incorrect data element cannot be distinguished from that of a correct data element, and the use of an aberrant data element such as this in an application, for example using a memory card, may have grave consequences.

To resolve the problem of possible interruptions during the updating of a memory, according to a first characteristic of the invention, the updating method uses a logic indicator that is characteristic of the updating and is itself updated only after the information to be updated has been written in the memory and then verified. This makes it possible to guarantee or secure the integrity of the information even in case of unexpected interruption while, at the same time, making it possible, if necessary, for the aborted operation to be resumed.

Furthermore, according to a second characteristic of the invention, so as never to lose trace of the prior data element during an updating operation, any new data value cannot be written at the same physical place as that of the value that it should replace. At least two memory locations are therefore used for a same data element. When the new value of the data element is written in the memory, one of the locations contains a value which shall hereinafter be called a protected or "secured outstanding value", while the other contains a so-called "non-secured working value".

According to a first variant, with each new updating there is associated a logic indicator characterizing the updating. The updated data element, which is not transferred, is read at the place where it has been written. If more than two memory locations are used, several values could be values of the "secured outstanding value" type, and it is the order in which the automation that uses the data can gain access to these different values that will enable the last secured value to be retrieved, if need be, following an interruption.

To this end, in this first variant described in greater detail here below, the device implements a cyclical binary counter without indeterminate state forming a sequence of logic indicators and a table of memory locations in which the information elements are stored.

The cyclical binary counter without indeterminate state is a simple logic binary string, for example a string of bits in an EPROM or EEPROM memory, made in such a way that when a bit goes from the blank state, arbitrarily called "0", to the programmed state, arbitrarily called "1", none of the other bits of the string suffers deterioration. Conversely, when the counter has to be reset at zero, the blank state for all the bits, the entire string of bits, without exception, is affected and all the bits return together to this blank state, then all the bits being in an identical instant at every instant during this zero-setting operation.

For an application to a memory in which it is impossible to update only one bit of one byte without disturbing the others, a string of bytes can be used as updating logic indicators.

Memories that can be used to make a binary logic string such as this are commercially available. The function described here above is a standard one in most EPROM memories, the simultaneous erasure being done by exposure to an ultraviolet radiation. This function exists also in certain EEPROM memories, manufactured by SGS THOMSON or by MOTOROLA, that are used chiefly in the field of computerized money applications, i.e. in most of the memories especially adapted to memory cards, where each bit of each byte goes from the blank state "0" to the programmed state "1" without deterioration in any other bit of the byte.

The association of the cyclical binary counter and of a table of memory locations for the data element necessitating updatings can be used to eliminate the indeterminate state that is possible during interruptions in the electrical supply.

The following detailed description of the updating method according to the invention specifies the sequencing of operations that can be used to arrive at this result: let D0 be the original value memorized and let D1 be the updated value of the data element D. As indicated here above, the data element D1 is written in a memory location other than that in which original value of the data element is located. Let E0 be the memory location of the original value D0, and let E1 be the memory location in which the value D1 will be stored. There is no constraint with respect to the arrangement of the memory locations E0 and E1. Hereinafter, these locations appear to be contiguous only to simplify the explanation.

In a first example, it is assumed that the memory is re-recordable: two memory locations alone can be designed for a data element to be updated, namely E0 and E1.

The cyclical binary counter is constituted by logic indicators, binary elements for example. Let $b_1, \ldots b_n$ be the logic indicators constituting the counter; the only values possible for these indicators are "0" and "1".

For access to an information element having a length of "N" bytes, the automation works in the following manner, described with reference to FIG. 1. The initial state of the automation is such that:

$b_0, \ldots b_n = [0, \ldots 0]$

E0 contains D0 and $b_0$ is set at "1";

E1 has an indeterminate content.

During a request for the updating of the data element D at an instant t1, the corresponding automation is called.

The first byte of D1 is written in the first byte of E1 at the instant t1+1, the second byte of D1 is written in the second byte of E1 at the instant t1+2 ..., the Nth byte of D1 is written in the Nth byte of E1 at the instant t1+N.

at the instant t1+N+1, the automation reads the value present at the location E1, at the instant t1+N+2, the value read at the location E1 is compared with the value D1 of the data element D to be updated, at the instant t1+N+3:

in the event of equality between the terms of the above comparison, the updating is ended and the automation writes the first blank bit $b_i$ of the counter, i.e. $b_1$ during this first updating which then goes to 1, in the event of inequality between the terms of the comparison, the writing of the value D1 at the location E1 has been badly done, and the automation returns an error code.

During the next updating of the same data element D, the value D2 of the data element will be written according to the same procedure at the location E0 and then verified, the first blank bit of the counter in the sequence of the bits of the counter being then written (i.e. $b_2$, during this second updating), when the written value D2 has been verified.

During the next updating of the same data element D requested at the instant t, the value Di of this data element will be written again according to the same procedure, either in E0 if i is an even number or in E1 if i is an odd number, the first blank bit of the counter, $b_i$, being written when the written value Di has been verified.

The string of indicator bits $[b_0, b_1 \ldots b_n]$ has a length n+1. When we reach the (n+1)th updating, the string of indicators is entirely at 1, the writing is then forced to the location E0 and the string of indicators is erased in a single stroke, then $b_0$ is set at "1" after verification of the data element written at E0. The device is then brought to a state similar to the initial state. This operation for the erasure of the indicators is such that all the bits $b_i$ are reset at zero simultaneously by a single operation of the type involving exposure to ultraviolet radiation for example.

For a reading of the value of the data element D requested at an instant t', the automation makes a search, in the sequence of the bits of the counter ($b_0 \ldots b_n$), for the last bit "$b_i$" at "1": if the value of "i" is even or zero, the value of the data element D is read at the location E0, and if the value of "i" is odd, the value of the data element D is read in E1.

A method such as this can give only an accurate value during the reading since the integrity of the writing has been validated. At worst, when an updating has not been carried through to the end, the automation reads the value written during the last accurate updating. Hence a value that may be not up-to-date but never an aberrant value.

Naturally, it is possible to provide for a number of locations for the same data data element that is greater than 2, namely E0, E1 ... Em, with m<n, where m+1 is the number of locations and n+1 is the number of bits of the counter. This makes it possible, as indicated here above, to have several secured values in progress in the successively used memory locations.

In the EEPROM type erasable memories, the possibility of erasing the memory can be turned to advantage to provide for cyclical operation on a set of positions E0, E1, E2 ... Em; when the automation detects that the validated value of the updated data element has been written in the last memory location Em, it writes the next value at the location E0: the number $b_i$ of bits written in the counter is such that i=m+1=0 modulo (m+1). For a cyclical use of memory locations such as this, the binary counter enables the retrieval of the location Ek of the last accurate value by computing simply the value k=i modulo (m+1), i being the rank of the last bit at "1" of the string and by assuming that the locations are written in the order E0, E1 . . . Em.

A structure such as this can also be used to update the data elements in the electrically programmable unerasable memories such as EPROMs. In this case, when all the locations E0, E1 . . . Em or when all the bits b0, b1, . . . bn have been written, the memory must be replaced, through the replacement of the card bearing this memory or through the allocation of new zones of the memory to the updating of this data element. In this mode, it is worthwhile for the number of memory locations to be the same as the number of bits of the counter.

The updating method described here above can be applied also to the updating of memories in which the writing operation is preceded by an explicit or implicit erasure of the designated location.

In brief, if "bi" is the last bit at "1" of the string of indicators, i being its rank in the string, the method is such that the automation obtains access, in reading mode, to the location Ej such that j=i modulo (m+1) and in writing mode to the location Ej+i. In principle, there is but little risk of there being bits that remain at 1 during a full erasure of the string after a cycle of n updatings. However, should such an anomaly occur, for example if the erasing operation is prematurely interrupted, there is a risk of error by the automation during the selection of the location to be read. This risk can be eliminated by a simple test on the string for only the configurations of the following type are normal: those in which all the bits bi are at "0" or in which all the bits preceding the last bit bi at 1 are at 1. All the combined configurations are abnormal and can only correspond to an attempt to zero-set the string of indicators: the location to be read is then, in all the "abnormal" cases, the location E0.

The only case of erasure that cannot be detected as being abnormal when it is in fact incomplete is the case where all the erased bits at "1" are to the right of a string of bits which, furthermore, has remained at 1, for this configuration is not "abnormal" from the logic viewpoint and cannot be detected by a check on the shape of the string.

To completely remove any risk of error, it is possible to use the same method as above to check the erasure of the string of bits, i.e. a checking indicator bit, namely Cx associated with the string of bits bi:

when the string of indicators is in normal use, Cx remains in the initial state: blank="0" by convention, when the string has to be reset at zero, the bit Cx is placed in the state "1", which means that the string of indicators is in an intermediate state before being reset at zero. The string is then erased, and then its erasure is verified, and if the erasure is correct (no bit bi at 1), the checking bit Cx associated with the string is reset at "0".

A sequence such as this can be used to remove any indeterminacy in the event of untimely interruption and makes it possible, in the event of an anomaly, to repeat the aborted operation, an error code being returned by the updating operation as soon as it has not been possible to verify an operation.

The updating device designed for the implementing of the method described here above, is illustrated by FIG. 2: it is a programmable processor 10, associated with a data memory 20. In this FIG. 2, it is assumed that these elements, i.e. microprocessor and memory, are associated with each other in a card 30 comprising memory and microprocessor. However, in the automation designed for the application required by this card, this microprocessor may be outside the card. The string of indicators 40 has been shown as forming part of a memory 50 which is independent of the memory 20. It may also form part of the memory 20, provided that this memory has the above-described function. The procedure is then commanded by a software program carrying out the steps of the above-described method and designed for this purpose in the microprocessor. However, the updating automation can also be made with specialized circuits performing the elementary circuits described here above. These two embodiments are within the scope of those skilled in the art.

In FIG. 2, the memory 20 has been illustrated with a table of memory locations TD [E0, E1, . . . E5], giving m=5 and the string of indicators, 40, with 12 indicators [b0, b1, . . . b11]. In the example illustrated, where [b0, b1, . . . b9] are at "1" and [b10, b11] are at "0", if a request for reading occurs, the data will be read at the location E3 and if an updating request occurs, the data element will be written at the location E4. As indicated here above, there is no data transfer in this first alternative embodiment, the trade-off here being that the data element should be read at the ad-hoc location after a test on the indicator bits.

A variant of the present invention also uses two memory locations but, in order that the data element may be always read at the same memory location E, the value of the updated data element written in another memory location and then verified is thereafter transferred therein. The method described in greater detail here below with reference to FIG. 3 consists in carrying out a request for the updating of a data element D, an initial value D0 of which has been written at the location E by the writing, in a memory space M designed for this purpose, of the following:

the value D1 of the updated data element, the address (E) at which it should be written, an indicator in a state 0 for example, for "false" indicating that the value of the data element has to be updated. The indicator will take, as a value "0", a value different from the value of the initial state of the memory, the value "1" being itself equal to the value of the initial state of the memory. If the application requires the updating of only a data element using this memory space, it is possible not to memorize the address which is always the same and which is a data element for the updating.

All these information elements having been written in the memory space designed for this purpose, a reading of this space is done to verify the written data elements:

in the event of a writing error, or in the event of a power cut, the verification cannot be used to establish the coincidence, and the value of the data element at the address E is not updated. An error code is transmitted and activates the resumption of the updating operation by a new recording;

in the event of coincidence, the data element present in the memory space is copied at the associated address, i.e. at the location E.

To this end, the automation that uses the card carries out the following sequence of operations, illustrated in FIG. 3, in performing the operations in a manner that is transparent for the user:

in a first step, the state of the indicator b is detected:

if the indicator is at "1" ("true"), there is neither an updating to be done nor any updating that has been incompletely done, and the value of the useful data element can be read at its address E;

if the indicator is at "0" ("false"), there is an updating in progress or an updating to be done, and the sequence of this updating is done as follows:

erasure of the value of the data element D present at the location E;

writing of the data element D1, present in the memory space M where it has been verified, at the location E;

positioning of the indicator at "1" ("true") indicating that the updating in progress is over and that the value of the data element D at its address E is a secured value.

This variant also makes it possible to have data elements that are always coherent in the useful memory for the application managed by the card. Indeed, after the card has accepted the updating order, the above-described method makes it possible to preserve the integrity of the data elements. If the last part of the sequence relating to the transfer of the data element to definitive memory location is interrupted, for example owing to a cut in the power supply, then the sequence will be resumed when the supply is re-established for the indicator is still in the "0" position ("false") and marks an updating that is to be done or that has not been completed, the new value being in the memory space that is not accessible in reading. The device always has a coherent value available since the old value is never erased without the system's knowing the new value and, in the end, the updated value always gets transferred before a reading.

As in the first variant described here above, for this second variant the device illustrated by FIG. 4 is such that when the memory is associated with a microprocessor, for example in the application to the cards (30) with memory (20) and microprocessor (10), the automation can be set up by software and may be present in the mask of the microprocessor. It can also be made by specific circuits, and the automation then made takes control over the program of the processor to carry out this updating sequence.

However, the device can also be implanted on simple memory components, using only one wired logic circuit (PLA). It is then a circuit coupled to the reading and writing control inputs of the memory.

The invention is not limited to the two variants specifically described here above: it can be applied to the updating of a memory word but it can be applied to the making of a smaller-sized memory zone or, on the contrary, to larger assembly of several memorizing "units", words or bytes. In every case, the new value of the data element is written in a memory location different from the one at which the previous value is available, this value being verified before the former value can be replaced in the application, a logic indicator changing its state to mark the end of the updating and the accessibility, in reading mode, of the new value.

What is claimed is:

1. A method for updating information elements in a memory which includes, for each kind of elements, two memory locations, wherein an initial value D0 of an information element has been written at a first location E0 of the memory of the two locations for that element, E0 being determined by an initial value of a string of indicator bits, the initial value being defined by the parity of the rank of a last bit of the string of indicator bits in a programmed state, the method comprising:

writing a new value D1 at the other location E1 of the memory for that element, E1 being determined by the parity of the rank of a first blank state bit of the string of logic indicator bits;

verifying the written value in E1 by comparing the written value in E1 with D1;

emitting an error code to a processing unit, if, after verifying the written value in E1, the written value in E1 does not match D1; and writing a bit of the string of indicator bits in a blank state subsequent to said last programmed state bit, to the programmed state if, after verifying the written value in E1, i) the value written in E1 matches D1 and ii) all the indicator bits are not in the programmed state, so as to make the value written in E1 accessible in a reading mode, wherein locations E0 and E1 are written alternately according to successive updatings.

2. Method according to claim 1, wherein the memory is an erasable re-recordable memory and includes, for each of a plurality of information elements to be updated, a memory location E to which the information element is transferred from E1 after verifying that the written value in E1 matches the value D1.

3. Method according to claim 2, wherein writing the new value D1 includes writing an address A(E) of the memory location E into which the information element will be transferred.

4. Method according to claim 3, wherein a logic indicator b associated with the transference of the information element to E is positioned in a first logic state before writing a new value D1.

5. Method according to claim 2, wherein a logic indicator b associated with the transference of the information element to E is positioned in a first logic state before writing the new value D1.

6. Method according to claim 1, wherein said memory is a memory card.

7. Method according to claim 3, wherein the memory card comprises a microprocessor and the method of updating the information element in the memory is implemented by a software program of the microprocessor of the memory card.

8. The method according to claim 1 further comprising erasing the string of indicator bits entirely so that all of the indicator bits are in a blank state and writing the first bit to the programmed state, if, after verifying the written value in E1, i) all the indicator bits are in the programmed state and ii) the written value in E1 matches D1, so as to make the value written in E1 accessible in a reading mode.

9. A method for updating information elements in a memory which includes a plurality of memory locations, wherein an initial value D0 has been written at a first location E0 of the memory, E0 being determined by an initial value of a string of indicator bits, the initial value being defined by the parity of the rank of a last bit of the string of indicator bits in a programmed state, the method comprising:

writing a new value D1 at another location E1 of the memory, E1 being determined by the first blank state bit parity of the rank of a string of logic indicator bits;

verifying the written value in E1 by comparing the written value in E1 with D1;

emitting an error code to a processing unit, if, after verifying the written value in E1, the written value in E1 does not match D1;

erasing the string of indicator bits entirely so that all of the indicator bits are in a blank state and writing the first bit to the programmed state, if, after verifying the written value in E1, i) all the indicator bits are in the programmed state and ii) the written value in E1 matches D1, and writing a first bit of the string of indicator bits in a blank state to the programmed state, so as to make the value written in E1 accessible in a reading mode.

10. A method according to claim 9, wherein, if, after verifying the written value in E1, i) all the indicator bits are in the programmed state and ii) the written value in E1 matches D1, the method further comprises:

writing a control bit to a control bit first state before erasing the string of indicator bits entirely;

verifying, the complete erasure of the string of indicator bits; and writing the control bit to a control bit second state.

11. Method according to claim 9, wherein said memory is a memory card.

12. Method according to claim 11, wherein the memory card includes a microprocessor and the method of updating the information element in the memory is implemented by a software program of the microprocessor of the memory card.

13. An updating device for updating information elements comprising:

a memory which includes a plurality of memory locations;

a string of indicator bits;

means for writing an initial value D0 at a first location E0 of the memory;

means for determining the location E0 by an initial value of the string of indicator bits, the initial value being defined by the parity of the rank of a last bit of the string of indicator bits in a programmed state;

means for writing a new value D1 at another location E1 of the memory, the location E1 being determined by the first blank state bit parity of the rank of a of the string of logic indicator bits;

means for verifying the written value in E1 by comparing the written value in E1 with D1;

means for emitting an error code to a processing unit, if, after verifying the written value in E1, the written value in E1 does not match D1;

means for erasing the string of indicator bits entirely so that all of the indicator bits are in a blank state and writing the first bit to the programmed state, if, after verifying the written value in E1, i) all the indicator bits are in the programmed state and ii) the written value in E1 matches D1, so as to make the value written in E1 accessible in a reading mode; and an automation designed to activate the different steps of the updating of the memory.

14. A device according to claim 13, further comprising a microprocessor connected to the memory, wherein the automation includes software implemented by the microprocessor connected to the memory.

15. A device according to claim 13, wherein the memory includes control inputs and the automation is a circuit coupled to the control inputs of the memory.

16. A device according to claim 13, wherein the string of indicator bits is a string of logic indicators without indeterminate state, said string of logic indicators being a value of binary elements without indeterminate state such that changing a binary element from the blank state to the programmed state does not effect other binary elements while, conversely, all the binary elements go from the programmed state to the blank state together by simultaneous erasure of the string.

17. An updating device for updating information elements comprising:

a memory which includes a plurality of memory locations;

a string of indicator bits;

means for writing an initial value D0 at a first location E0 of the memory;

means for determining E0 by an initial value of the string of indicator bits, the initial value being defined by the parity of the rank of a last bit of the string of indicator bits in a programmed state;

means for writing a new value D1 at another location E1 of the memory, E1 being determined by the parity of the rank of a of the string of logic indicator bits;

means for verifying the written value in E1 by comparing the written value in E1 with D1;

means for emitting an error code to a processing unit, if, after verifying the written value in E1, the written value in E1 does not match D1;

means for erasing the string of indicator bits entirely so that all of the indicator bits are in a blank state and writing the first bit to the programmed state, if, after verifying the written value in E1, i) all the indicator bits are in the programmed state and ii) the written value in E1 matches D1, so as to make the value written in E1 accessible in a reading mode;

means for writing a first bit of the string of indicator bits in a blank state to the programmed state if, after verifying the written value in E1 and before erasing, i) the value written in E1 matches D1 and ii) all the indicator bits are not in the programmed state, so as to make the value written in E1 accessible in a reading mode; and an automation designed to activate the different steps of the updating of the memory.

18. A device according to claim 17 further comprising means for transferring the information element from E1 to a memory location E after verifying that the written value in E1 matches the value D1, wherein the memory is an erasable re-recordable memory and includes, for each of a plurality of information elements to be updated, the memory location E.

19. A device according to claim 18, further comprising a microprocessor connected to the memory, wherein the automation includes software implemented by the microprocessor connected to the memory.

20. A device according to claim 18, wherein the memory includes control inputs and the automation is a circuit coupled to the control inputs of the memory.

21. A device according to claim 18, wherein the string of indicator bits is a string of logic indicators without indeterminate state, said string of logic indicators being a value of binary elements without indeterminate state such that changing a binary element from the blank state to the programmed state does not effect other binary elements while, conversely, all the binary elements go from the programmed state to the blank state together by simultaneous erasure of the string.

22. A method for updating information elements in a memory which includes a plurality of memory locations, wherein an initial value D0 has been written at a first location E0 of the memory, E0 being determined by an initial value of a string of indicator bits, the initial value being defined by the parity of the rank of a last bit of the string of indicator bits in a programmed state, the method comprising:

writing a new value D1 at another location E1 of the memory, E1 being determined by the parity of rank of a of the string of logic indicator bits;

verifying the written value in E1 by comparing the written value in E1 with D1;

emitting an error code to a processing unit, if, after verifying the written value in E1, the written value in E1 does not match D1;

erasing the string of indicator bits entirely so that all of the indicator bits are in a blank state and writing the first bit to the programmed state, if, after verifying the written value in E1, i) all the indicator bits are in the programmed state and ii) the written value in E1 matches D1, so as to make the value written in E1 accessible in a reading mode; and writing a first bit of the string of indicator bits in a blank state to the programmed state if, after verifying the written value in E1 and before erasing, i) the value written in E1 matches D1 and ii) all the indicator bits are not in the programmed state, so as to make the value written in E1 accessible in a reading mode, wherein the plurality of memory locations are written serially according to successive updatings.

* * * * *